United States Patent [19]

Bengtson

[11] Patent Number: 4,956,854
[45] Date of Patent: Sep. 11, 1990

[54] DIGITAL PATTERN DECODER
[75] Inventor: Dale F. Bengtson, Schaumburg, Ill.
[73] Assignee: Motorola, Inc., Schaumburg, Ill.
[21] Appl. No.: 242,450
[22] Filed: Sep. 9, 1988
[51] Int. Cl.$^5$ ............................................. H04L 7/08
[52] U.S. Cl. .................................. 375/111; 340/146.2; 364/715.11; 375/116
[58] Field of Search ................. 371/61, 70; 340/146.2; 364/715.11; 375/106, 111, 114, 116

[56] References Cited

U.S. PATENT DOCUMENTS

| | | | |
|---|---|---|---|
| 3,493,929 | 2/1970 | Webb | 364/715.11 |
| 4,160,240 | 7/1979 | Partipilo | 371/70 |
| 4,389,636 | 6/1983 | Riddle, Jr. | 371/70 |
| 4,829,462 | 5/1989 | Freeman et al. | 340/146.2 |
| 4,876,740 | 10/1989 | Levine et al. | 375/114 |

Primary Examiner—Benedict V. Safourek
Attorney, Agent, or Firm—Rolland R. Hackbart

[57] ABSTRACT

A decoder decodes a predetermined binary pattern from within a data stream, wherein the pattern includes a repetitious series of binary digits and each series of digits is composed of 2N bits, N being a positive integer greater than 1, and the first N bits is the complement of the second N bits of the series. The decoder includes a bit synchronizer for synchronizing to the bits of the pattern, a digital phase locked loop for generating a clock signal from the received data, a comparator and memory for analyzing the data stream in an alternating manner so as to generate N paths, wherein each path receives every Nth respective bit of the data stream, and an arithmetic logic unit for calculating and measuring the integrity of the pattern in the received data.

3 Claims, 4 Drawing Sheets

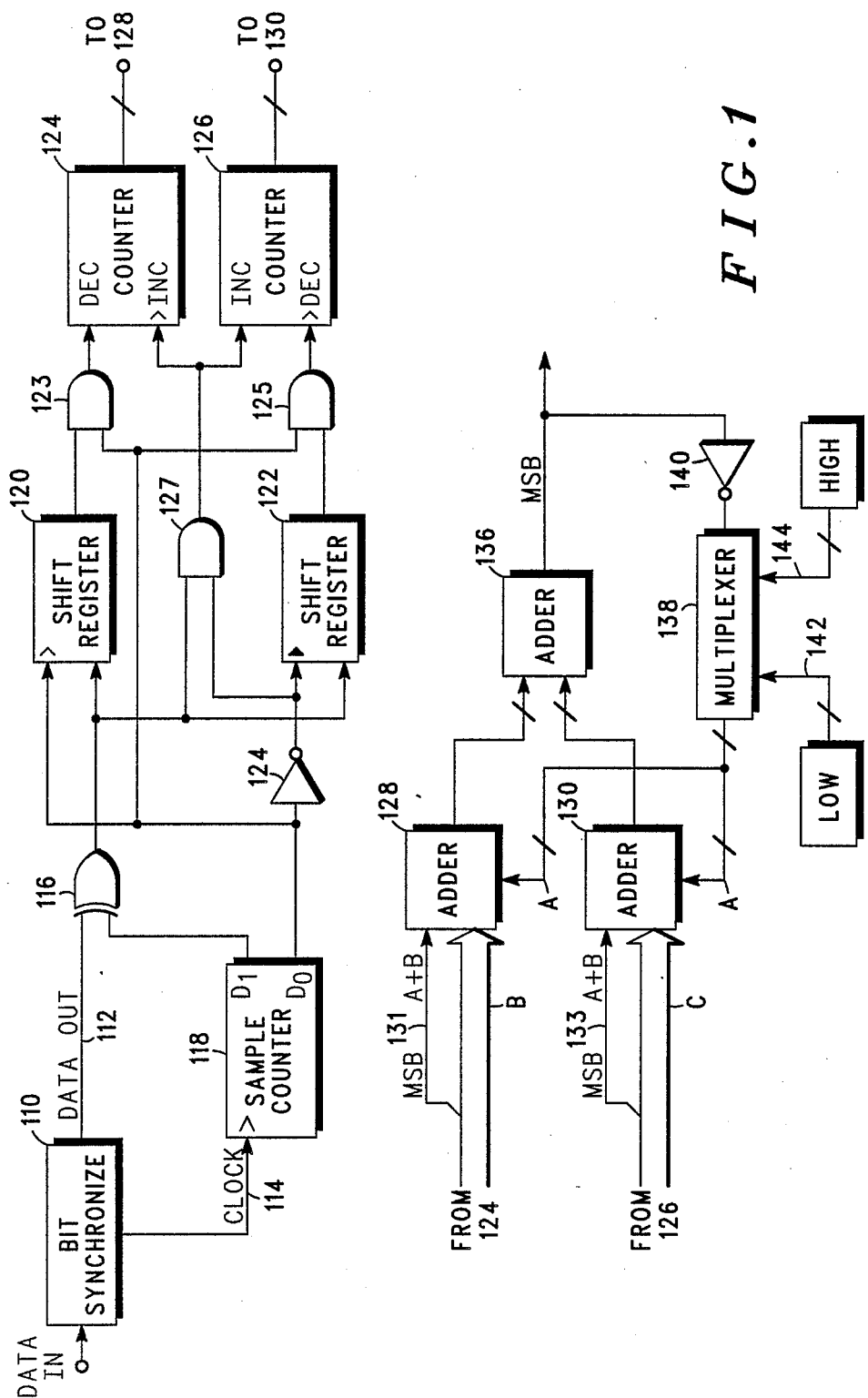

DIGITAL PATTERN DECODER

FIELD OF THE INVENTION

The present invention relates generally to digital decoding arrangements, and, more particularly, to decoding predetermined digital codes having repetitious patterns.

DESCRIPTION OF THE PRIOR ART

Serial data streams are commonly used in radio frequency (RF) communication to establish communication path quality. At the receiving end of the path, circuitry is commonly used to collect a significant number of data bits composing the data stream. If a sufficient number of bits are received, the communication path is determined to be an effective one, and communication thereon is allowed to proceed. Generally, the number of bits that are received and validated at the receiving end is directly related to the reliability of the path. Thus, for a very reliably path, the number of bits that must be validated before communication on the path is allowed to proceed is generally very large.

Unfortunately, receiving and validating a large number of bits at the receive end requires a significant amount of data bit memory or processing time. The data bit memory is necessary to compare the input data stream to a predetermined data pattern in order to determine the number of bits that meet the pattern. The processing time becomes excessive in processor implementations of such a bit by bit comparison. In either case, such a bit by bit analysis is often unacceptable for a memory conscious or a time conscious application.

There is therefore a need for a digital pattern decoder which overcomes these deficiencies.

OBJECT OF THE PRESENT INVENTION

It is an object of the present invention to provide a digital pattern decoder which overcomes the aforementioned deficiencies.

It is an additional object of the present invention to provide a digital pattern decoder which decodes a bit pattern dynamically and in a high speed manner.

It is yet an additional object of the present invention to provide a digital pattern decoder which requires only bit synchronization, not byte or pattern synchronization.

BRIEF DESCRIPTION OF THE DRAWINGS

FIG. 1 is a first block diagram of a digital pattern decoder, according to the present invention.

DETAILED DESCRIPTION OF THE PREFERRED EMBODIMENT

Figure 2A:
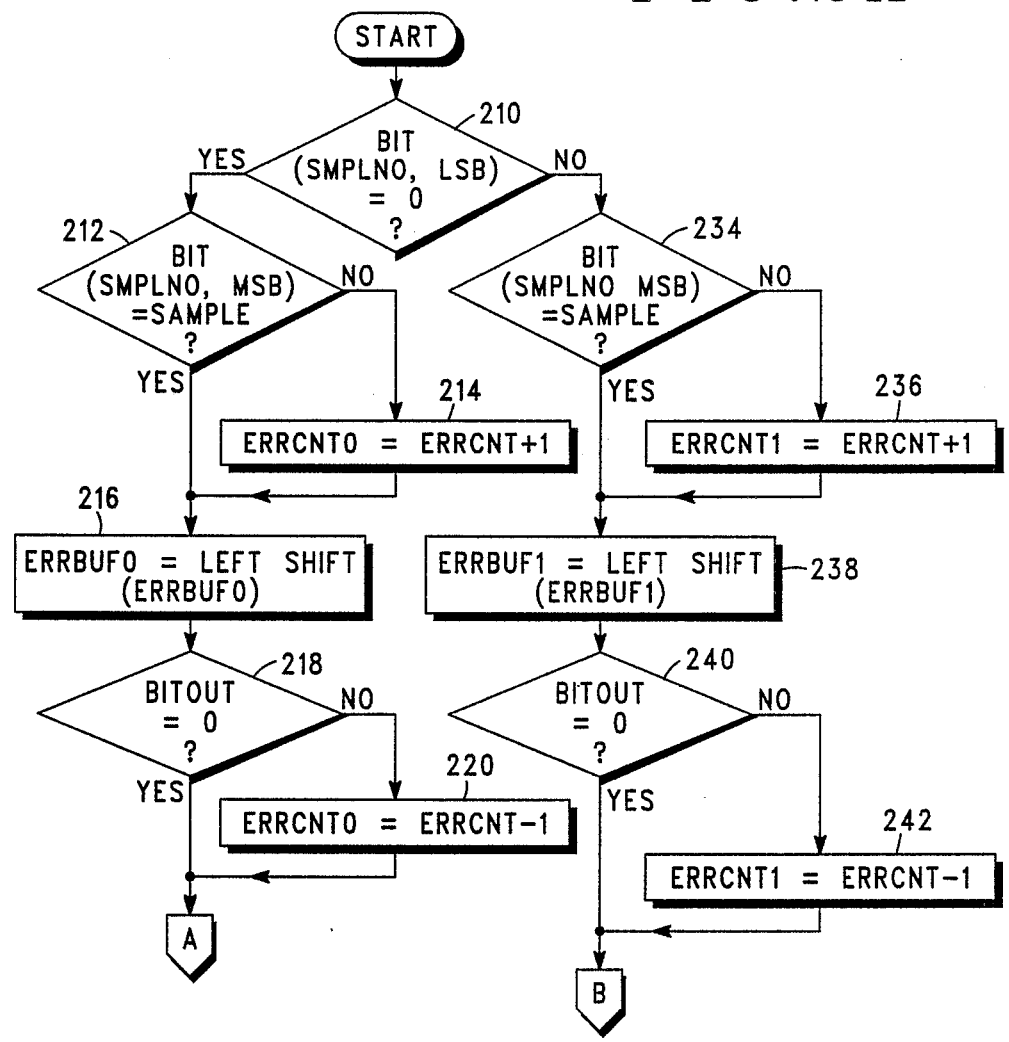
FIG. 2a-2c are flow charts of a digital pattern decoder, for use by a conventional microprocessor, according to the present invention.

The present invention is directed to a digital pattern decoding process in which only bit synchronization is required, i.e., no pattern or byte synchronization is required. The preferred embodiments, discussed below with the figures, employ an inventive concept which will now be generally described.

The concept, in accordance with the present invention, is most useful with a predetermined serial binary pattern having a length of 2N bits wherein the second N bits are the one's complement of the first N bits. For example, the following patterns constitute such a pattern:

$$0\ 1100\ 1100\ 1100\ 1100\ 110;\ \text{and} \qquad (1)$$

$$10110100\ 10110100 \qquad (2)$$

(or a subset or expansion of either).

The inventive process analyzes the pattern by receiving it in N paths, wherein each path is respectively defined by repetitiously receiving the Nth bit, beginning at the ith bit of the first N bits, for $1 \leq i \leq N$.

For example, in the first of the above two patterns, N=2. Thus, the pattern is received in 2 paths. The first path includes every other bit beginning at the first bit, i.e., 0101010101, while the second path includes every other bit beginning at the second bit, i.e., 1010101010.

In the second of the above two patterns, N=4. Thus, the pattern is received in 4 paths. The first path includes every fourth bit beginning at the first bit, i.e., 1010, the second path includes every fourth bit beginning at the second bit, i.e., 0101, the third path includes every fourth bit beginning at the third bit, i.e., 1010, and the fourth path includes every fourth bit beginning at the fourth bit, i.e., 1010.

In either example, it can be recognized that each path includes an oscillating digital pattern, i.e., . . . 0101010 . ., presuming that the pattern includes no errors. Operating under this presumption, each path represented by this oscillating digital pattern is compared to a clock signal that is bit synchronized to the bits that are received in the pattern. If there are no errors in each respective path, the output of each respective comparator will remain at a constant level. However, if there are errors in the path, the output of each comparator will change in level for each error. The errors are then counted, and the accumulation of such errors is compared to a threshold number to determine the accuracy of received pattern, i.e., its integrity.

The manner in which the above concept is preferably implemented, according to the present invention, is described in terms of a hardware implementation (FIG. 1) as well as in terms of a flow chart (FIG. 2) for implementation by a microcomputer.

Referring now to FIG. 1, there is shown a hardware block diagram of a digital pattern decoder for the first of the above two predetermined serial binary patterns. The decoder of FIG. 1 operates in accordance with the above generalization, but is designed to provide a number of significant advantages which will become apparent herewith. Included in FIG. 1 is a conventional bit synchronizer 110 which receives the digital pattern to be validated. The bit synchronizer 110 may be implemented using any conventional digital phase lock loop, preferably implemented in software by a microcomputer.

The bit synchronizer 110 includes two outputs, a data output 112 and a clock output 114. The data output 112 is a conventional sampled output which represents the data received by the bit synchronizer 110 in the same serial form. The clock output 114 is a clock output signal that is derived from the data input to the bit synchronizer 110. The clock output 114 includes a rising edge for every bit received by the bit synchronizer 110.

The outputs from the bit sychronizer 110 are received by an EXOR gate 116 and a sample counter 118. The sample counter 118 is preferably at least a 2-bit rollover digital counter which is clocked by the clock output 114. The EXOR gate 116 receives the data output 112 along with the most significant bit (MSB), D1, from the sample counter 118 to generate the above discussed comparison function between the received digital pattern and the clock signal.

The comparison function is implemented by employing two shift registers (SRs) 120 and 122 in addition to the EXOR gate 116. Both SRs 120 and 122 shift in the signal provided by the output of the EXOR gate 116 at a rate defined by the least significant bit (LSB), D0, of the sample counter 118. Because the decoder of FIG. 1 is designed to decode the digital pattern: . . . 00110011001100011 . . . , if there are no errors in the received digital pattern, the data that is shifted into both SRs 120 and 122 will be constant. Thus, after sufficient shifting of such data through each SR 120 or 122, the output of each SR will not change, and a partial indication of the integrity of the received pattern is provided at the output of the EXOR gate 116.

The SRs 120 and 122 are preferably of sufficient length to provide sufficient delay to measure a representative sample of the received data. In this manner, the decoder continuously measures the number of errors as a window of the received data is shifted through the SRs 120 and 122. For example, to detect the first of the above two predetermined patterns over 96 sequential bits, each SR 120 or 122 preferably includes 48 registers, bits of storage. As will be subsequently recognized, because the validation of the received pattern is performed as bits are received by the decoder of FIG. 1, the decoder is able to analyze the received bits without ever having to synchronize to the beginning or end of the pattern itself.

The outputs of the SRs 120 and 122 are coupled to error counters 124 and 126, respectively, which are used to accumulate (count) the number of transitions, or received bit errors, at the output of the EXOR gate 116. The error counters 124 and 126 are preferably both conventional binary up-down counters having 8 outputs for representing a binary number as large as 63. The accumulation is accomplished by decrementing, via respective AND gates 123 and 125, each error counter for every binary 1 that is shifted out of each respective SR, and by incrementing, via AND gate 127, each error counter for every binary 1 that is shifted into each respective SR. This operation can best be explained by way of examples.

Consider the state of the decoder of FIG. 1 at a time when the decoder has been receiving random noise. Each SR contains all an equal number of 1s and 0s in this instance. For every subsequent bit received by the decoder, assuming that such subsequent bits do not continue to represent the pattern, the error counters will be continuously incremented and decremented to an average binary number having a magnitude approximately equal to zero. Zero magnitude at the output of each counter indicates that the decoder has not received any portion of the predetermined pattern.

From the above state of the decoder, consider the decoder beginning to receive the predetermined pattern. Assume that the bit synchronization causes 1s to be generated at the output of the EXOR gate 116. As each SR is filled with 1s, the counters 124 and 126 will increment faster than they decrement due to more 1s shifting into each SR than shifting out of each SR, and the counters 124 and 126 will count to positive numbers having relatively large magnitudes.

Alternatively, from the same above state of the decoder, consider the decoder beginning to receive the predetermined pattern, but assume that the bit synchronization causes 0s to be generated at the output of the EXOR gate 116. As each SR is filled with 0s, the counters 124 and 126 will decrement faster than they increment due to more 0s shifting into each SR than shifting out of each SR, and the counters 124 and 126 will count to negative numbers having relatively large magnitudes. Regardless of the sign of the numbers output by the counters 124 and 126, both numbers having a relatively large magnitude will indicate that the pattern has been detected.

Now consider the state of the decoder of FIG. 1 at a time when an errorless pattern has already been received, as described above. In this example assume each SR contains all 0 s. As indicated above, the counters 124 and 126 would have counted to a negative number having a relatively large magnitude. For every subsequent bit received by the decoder, assuming that such subsequent bits do not continue to represent the pattern, the counters 124 and 126 will be decremented toward zero. When both counters either decrement or increment toward zero, the decoder is detecting the termination of the predetermined pattern. As will be described further below, when the outputs of the counters fall within a threshold number, with respect to zero, the decoder indicates that the pattern is not presently detected.

The outputs from each 124 or 126 counter are respectively coupled to adders 128 and 130, which may be implemented using conventional digital logic. The functions of each adder 128 or 130 are twofold. First, each adder must be capable of adding two binary numbers, one binary number being provided by the respective counter and the other being one of two predetermined constants provided by a multiplexer 138. The second function of each adder is to invert the input from the respective counter before the adding function is implemented. The inversion step is only implemented if the MSB from the output of the respective counter 124 or 126 is a 0 (zero), as indicated by the respective A+B signals 131 and 133. The functions of the adders 128 and 130, along with a subsequent adder 136, allows the decoder of FIG. 1 to measure and compare the relative magnitude of the number provided by the output of the error counters with a pair of predetermined thresholds in order to validate the integrity of the received pattern.

The integrity of the received pattern is mathematically measured by first subtracting the magnitude represented at the output of each counter 124 or 126 from the number of allowable errors in the received pattern. For example, if the number of allowable errors is 24, then the number of allowable errors for each of the two paths for this pattern is 12 (12 being the threshold for each path). Using these exemplary numbers, the number at the output of the error counter 124 is +25, and the number at the output of the error counter 126 is −25. The adder 128 will generate a sum of −13 (12−+25), while the adder 130 will generate a sum of −13 (12+−25). The sums at the respective outputs of the adders 128 and 130 are added by adder 136.

The adder 136 generates a signal representing the MSB of the sum of the outputs 128 and 130. Considering once again the previous numerical example, with −13 at each output of the adders 128 and 130, the output of the adder 136 will be 1 (MSB for the sum −26). The 1 at the output of adder 136 indicates that the decoder has detected the predetermined pattern . . . 001100110011 . . . Once the predetermined pattern stops being received at the input of the decoder, the number at the output of the counters 124 and 126 will eventually decrease in magnitude to a number that is less than the threshold number of allowable errors. When this occurs, the adders 128 and 130 will generate positive numbers, and the output signal provided by the adder 136 will be 0, indicating that the pattern is no longer detected.

In light of the above examples, it should be pointed out that the numbers output by the counters 124 and 126 are not typically equal in magnitude. The magnitude of these numbers will differ according to the number of errors received on their respective paths.

The MSB at the output of the adder 136 is provided to a multiplexer 138, via an inverter 140, to provide hysteresis to the threshold of allowable errors. The multiplexer 138, based on the input from inverter 140, passes one of two predetermined constant numbers to the adders 128 and 130. A low number is provided via signal path 142, and a high number is provided via signal path 144. If the pattern has just been detected, MSB=1 at the output of the adder 136 and the low number is passed through the multiplexer 138 to the adders 128 and 130. This forces a significant change in the number of errors detected in the received pattern before the MSB at the output of the adder 136 changes to a 0, indicating that the pattern is not presently detected. Conversely, while the pattern is not presently detected, the high number is passed to the adders 128 and 130 to force a significant improvement in the integrity of the received data before the adder 136 will indicate that the pattern is presently detected.

Accordingly, while slight changes in the number of errors of the received pattern may fluctuate, the decoder, via the MSB provided at the output of the adder 136, will not constantly change.

Figure 2B:
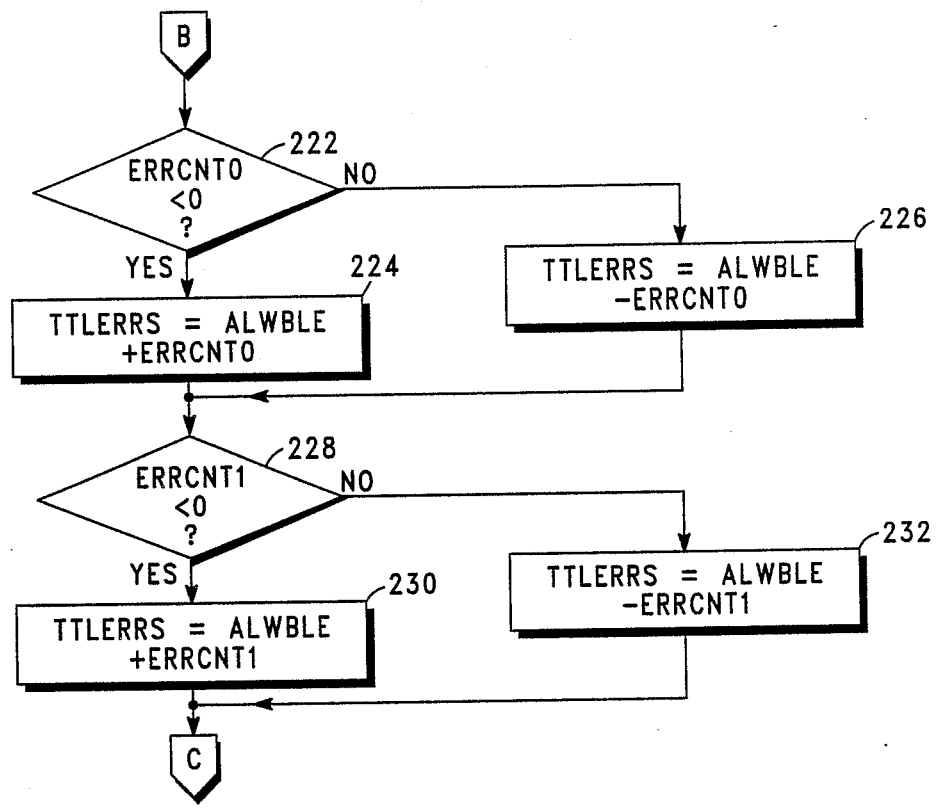
Figure 2C:
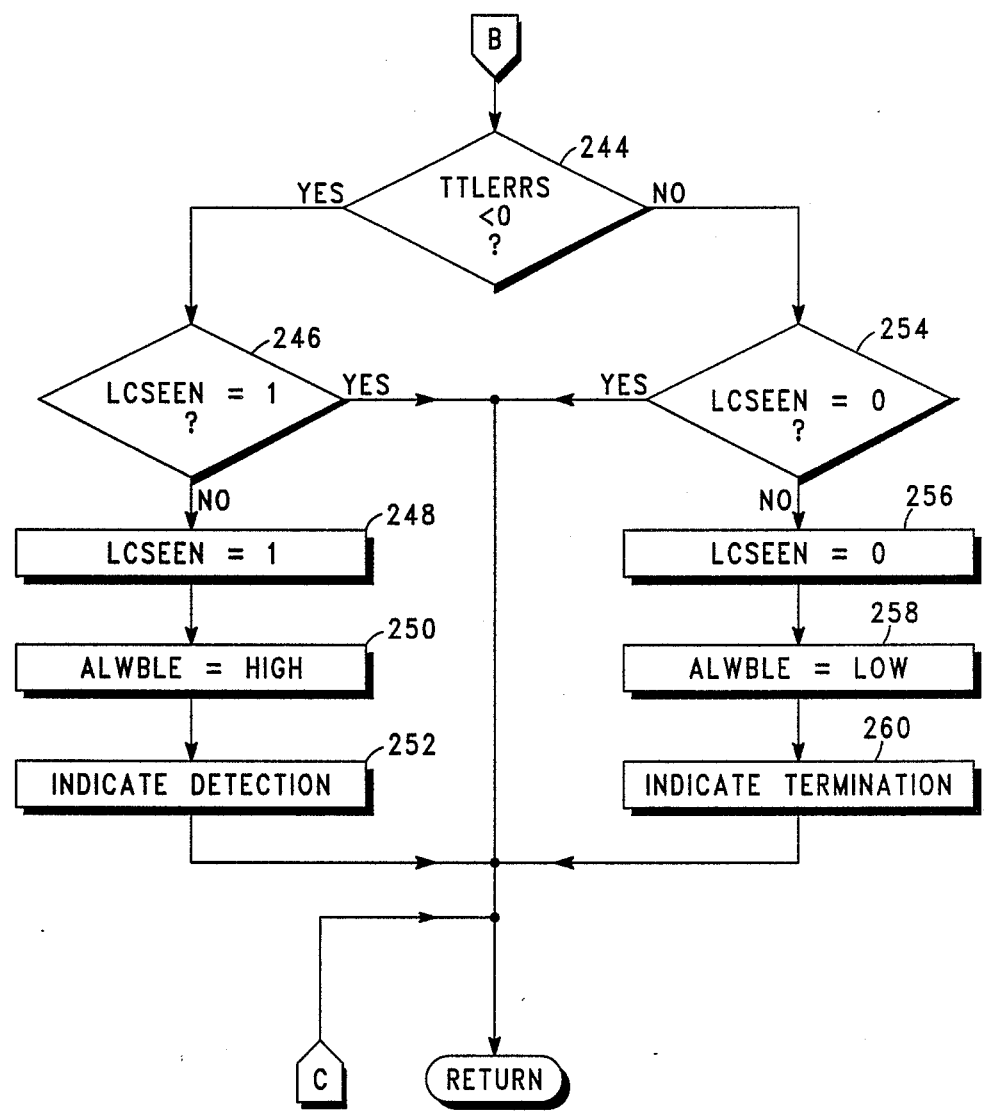

Now referring to FIGS. 2A, 2B and 2C, there is shown a flow chart which may be used to implement the previously described decoder using a conventional microcomputer having a serial input port, such as the MC68HC05, available from Motorola, Inc. The flow chart begins at block 210 of FIG. 2A where a test is performed to determine if the LSB of the sample counter output is equal to zero. A synchronization process is performed as indicated, preferably using a conventionally programmed digital phase locked loop. The sample counter in this embodiment is implemented using software controlled timing functions. From block 210 flow proceeds to block 212 if the least significant bit of the sample counter is equal to zero.

At block 212 another test is performed to determine whether or not the most significant bit of the sample counter is equal to the data sample received from the input stream. This test is the equivalent of the EXOR function (gate 116) of FIG. 1. From block 210 flow proceeds to block 214 if the EXOR comparison indicates that the compared bits are not the same. At block 214, a counting variable, ERRCNT0, is incremented. This variable ERRCNT0 is the equivalent of the output provided by the counter 124 of FIG. 1. From block 212, flow proceeds to block 216 if the comparison at block 212 indicates that the bits compared are the same. At block 216, a microcomputer register is employed to perform the function of block 120 of FIG. 1. The binary result of the EXOR function performed at block 212 is left shifted into the shift register (ERRBUF0).

From block 216, flow proceeds to block 218 where a test is performed to determine if the overflow from the shift which was executed at block 216 generated a zero. This test represents the AND function of gate 123 of FIG. 1. If the bit that was shifted out of the shift register was not equal to a zero, then ERRCNT0 is decremented as indicated at block 220.

From block 218, flow proceeds to block 222 if the bit that was shifted out of ERRBUF0 was equal to zero. At block 222, a test is performed to determine if the most significant bit of ERRCNT0 is a one or a zero. This test is the equivalent of the signal 131 provided to the adder 128 of FIG. 1. Thus, the addition and subtraction functions performed at blocks 224 and 226, respectively of FIG. 2b, represents the addition/subtraction function of the adder 128 of FIG. 1. In blocks 224 and 226, ALWBLE represents the threshold provided by the multiplexer 138 of FIG. 1, while TTLERS (total errors) is representative of the output adder 128.

From either block 224 or block 226 flow proceeds to block 228, block 230 and block 232 where the adding functions of the adder blocks 130 and 136 of FIG. 1 are performed. ERRCNT1 depicted in block 228 represent the output of counter 126 of FIG. 1. The respective addition and subtraction functions in blocks 230 and 232 can readily be recognized as the combination of the adding functions of adders 130 and 136 of FIG. 1. From blocks 230 and 232, flow returns to block 210 where this process is continually performed as each bit is received.

Referring once again to block 210, if the least significant bit of the sample counter is equal to a one, flow proceeds along a path consistent with the functions of a shift register 122 and the counter 126 of FIG. 1. From 210, flow proceeds to block 234 where a test is performed to determine if the most significant bit output from the sample counter is equal to the data sample. Once again, being similar to the test performed at block 212 of FIG. 2A, the function at block 234 represents the EXOR comparison of the EXOR gate 116 of FIG. 1. From block 234, flow proceeds to block 236 if the binary result of the EXOR comparison is equal to one. At block 236, the count variable, ERRCNT1, is incremented. This count variable represents the function of the counter 126 of FIG. 1. From block 234, flow proceeds to block 238 if the binary result of the EXOR comparison is equal to zero. At block 238, a second microcomputer register is employed to provide the equivalent function of the shift register 122 of FIG. 1. The binary result is left shifted into this register (ERRBUF1).

From block 238, flow proceeds to block 240 where a test is performed to determine if the over flow bit, i.e., the bit that was shifted out of the register ERRBUF1, was equal to zero. If the overflow bit was not equal to zero, flow proceeds to block 242 where the count variable ERRCNT1 is decremented, being the equivalent of the decrement to the counter 126.

From block 240, flow proceeds to block 244 if the bit that was shifted out of ERRBUF1 was equal to zero. At block 244, a test is performed to determine if TTLERRS, the variable representing accumulated errors from the mathematical functions performed at blocks 128, 130 and 136 of FIG. 1, is a positive or a negative number. If TTLERRS is a negative number, flow proceeds from block 244 to block 246. At block 246, another test is performed to determine if the predetermined pattern has already been detected in the data that is being received. If the pattern has been detected, a variable, LCSEEN will have been already said equal to one. The variable LCSEEN represents the output of the adder 136 of FIG. 1. If the pattern has already been detected, flow returns to block 210 for an analysis with the next bit received. If the pattern has not already been detected, flow proceeds from block 246 to block 248 where the variable LCSEEN is set equal to one to indicate that the pattern has now been detected. From block 248, flow proceeds to block 250 where the variable ALWBLE (representing the threshold provided to the adders 128 and 130 of FIG. 1) is said equal to the high number for hysteresis purposes as previously discussed (depicted via the multiplexer 138 and the signal 144 of FIG. 1). From block 250, flow proceeds to block 252 where the microcomputer generates an external output signal indicating that the pattern has been detected. From block 252, flow returns to block 210.

Referring once again to block 244, flow proceeds to block 254 if the variable TTLERRS indicates that the representative sum from the adder 128 and 130 is a positive sum. At block 254, another test is performed to determine if the predetermined pattern has already been detected in the received data. If the predetermined pattern has not been detected, flow returns from block 254 to block 210. If the predetermined pattern has been detected, flow proceeds from block 254 to block 256 where the microcomputer sets LCSEEN to zero to indicate that the pattern is not currently detected in the received data. From block 256, flow proceeds to block 258 where the threshold variable, ALWBLE, is set to low number to accommodate the previously discussed hysteresis function. From block 258, flow proceeds to block 260 where the microcomputer generates an external output signal to indicate that the predetermined pattern is not presently being detected. From block 260, flow returns to block 210.

We claim:

1. A decoder for decoding a predetermined binary pattern from within a data stream, wherein the pattern includes a repetitious series of binary digits and each series of digits is composed of 2N bits, N being a positive integer greater than 1, and the first N bits is the complement of the second N bits of the series, comprising:

first means for bit synchronizing to the bits of the pattern;

second means, responsive to the first means, for generating a clock signal;

third means for analyzing the data stream in an alternating manner so as to generate N paths, wherein each path receives every Nth respective bit of the data stream;

fourth means, responsive to the clock signal and to each respective data path, for comparing the clock signal to each respective data path; and means, responsive to said fourth means, for determining if the pattern is encompassed within the data stream.

2. A decoder for decoding a predetermined binary pattern from within a data stream, wherein the pattern includes a repetitious series of binary digits and each series of digits is composed of 2N bits, N being a positive integer greater than 1, and the first N bits is the complement of the second N bits of the series, comprising:

first means for bit synchronizing to the bits of the pattern;

second means, responsive to the first means, for generating a clock signal;

third means, responsive to the clock signal, for comparing the clock signal to the bits of the data stream so as to generate a comparison output signal;

fourth means, responsive to said third means, for analyzing the comparison output signal in N paths;

memory means for accumulating each comparison output signal within each respective path; and means, responsive to said memory means, for determining if the pattern is encompassed within the data stream.

3. A decoding method for decoding a predetermined binary pattern from within a data stream, wherein the pattern includes a repetitious series of binary digits and each series of digits is composed of 2N bits, N being a positive integer greater than 1, and the first N bits is the complement of the second N bits of the series, comprising the steps of:

bit synchronizing to the bits of the pattern;

responsive to the step of bit synchronizing, generating a clock signal;

analyzing the data stream in an alternating manner so as to generate N paths, wherein each path receives every Nth respective bit of the data stream;

responsive to the clock signal and to each respective data path, comparing the clock signal to each respective data path; and determining if the pattern is encompassed within the data stream.

* * * * *